(12) United States Patent
Hein et al.

(10) Patent No.: US 6,269,833 B1
(45) Date of Patent: Aug. 7, 2001

(54) SPENT FUEL POOL ANTI-SIPHON SYSTEM

(75) Inventors: Herman W. Hein; Rene R. Gonzalez, both of Van Vleck, TX (US)

(73) Assignee: STP Nuclear Operating Company, Wadsworth, TX (US)

( * ) Notice: Subject to any disclaimer, the term of this patent is extended or adjusted under 35 U.S.C. 154(b) by 0 days.

(21) Appl. No.: 09/465,627

(22) Filed: Dec. 17, 1999

(51) Int. Cl.[7] .................................................. F16K 24/00
(52) U.S. Cl. ........................................ 137/216; 137/582
(58) Field of Search ................................... 137/216, 582

(56) References Cited

U.S. PATENT DOCUMENTS

| | | | |
|---|---|---|---|
| 3,779,865 | 12/1973 | Schafstall | 176/38 |
| 3,951,164 | 4/1976 | Crist | 137/218 |
| 4,412,969 | 11/1983 | Tilbrook | 376/280 |
| 4,438,861 | * 3/1984 | McGuffey | 137/216 X |
| 4,534,931 | 8/1985 | Schneider | 376/272 |
| 4,749,542 | 6/1988 | Dunn | 376/404 |
| 5,046,529 | 9/1991 | Corella | 137/590.5 |
| 5,199,455 | 4/1993 | Diouhy | 137/217 |
| 5,268,942 | 12/1993 | Newton | 376/272 |
| 5,476,185 | 12/1995 | Jimerson | 220/86.3 |
| 5,592,964 | 1/1997 | Traylor | 137/216 |
| 5,705,054 | 1/1998 | Hyrsky | 210/109 |

* cited by examiner

Primary Examiner—Gerald A. Michalsky
(74) Attorney, Agent, or Firm—Bracewell & Patterson, L.L.P.

(57) ABSTRACT

A transfer system for transferring liquid from a liquid source to a reservoir which includes a fluid conduit having a coupling attached to an inlet end and an anti-siphon apparatus, having an upper and lower end, attached to an outlet end. The coupling may be a quick-connect coupling. The anti-siphon apparatus is mounted on the inlet end of the fluid conduit such that the lower end is located below the minimum water level of the reservoir and the upper end is located above the maximum water level of the reservoir. In addition, the upper end of the anti-siphon apparatus is located above the liquid outlet of the fluid conduit. The anti-siphon apparatus includes a baffle suitable for maintaining an air gap between water in the reservoir and the liquid outlet. Optionally, the transfer system may have an apparatus for removably mounting the system to an object such as a seal gate.

22 Claims, 2 Drawing Sheets

SPENT FUEL POOL ANTI-SIPHON SYSTEM

BACKGROUND OF INVENTION

1. Field of the Invention

The present invention provides a system for transferring liquid from one location to another while preventing the siphoning of the liquid through the system opposite the intended direction of flow. More particularly, the present invention provides a system for transferring water from a transfer canal to a spent fuel pool in a nuclear reactor facility, the system preventing the siphoning of water from the spent fuel pool, which may contain radioactive contaminants, back into the transfer canal.

2. Description of the Prior Art

The transfer of liquid between locations that are at different levels or heights creates the potential problem of liquid being siphoned between the two locations. In many applications, siphoning is unacceptable and adequate measures must be taken to prevent its occurrence. This need is particularly important where radioactive materials are involved and the possibility of contamination is present, such as in a nuclear reactor facility where water must be transferred into the spent fuel pool. The spent fuel pool is a large tank with racks to hold spent nuclear reactor material. The pool is filled to a specified level with water. Trace chemical elements present in the water may become radioactive in the presence of the reactor material over time. It is important that the water level in the spent fuel pool be kept within specific limits. Water must be added at times to maintain the proper water level within these limits for cooling and safety reasons. The source for additional water is typically a transfer canal. The water and any dissolved trace elements in the transfer canal to be added are not radioactive. It is desirable for safety and contamination prevention not to have water from the spent fuel pool siphoned back into the transfer canal. Otherwise, there is the potential for radioactive contamination of water in the transfer canal, as well as causing of an undesirable decrease of the water level in the spent fuel pool.

One technique for prevention of siphoning is shown in U.S. Pat. No. 5,046,529 (Corella), which describes a potable water system having a container with an internally disposed standpipe. The standpipe has an anti-siphon port near the top to prevent the backflow of water from within the container out through the inlet flow line. A significant disadvantage of this system is that the water level inside the container may rise to a level above the port in the standpipe, and water in the container could then flow out through the inlet flow line. Clearly, this type of system would be unsatisfactory for use in a nuclear facility, as backflow, in any amount, presents a contamination hazard and is therefore unacceptable.

Another system is shown in U.S. Pat. No. 5,268,942 (Newton), which is directed to a temporary cooling system for use in nuclear power plants. The system includes an anti-siphon mechanism in the form of one or more anti-siphon holes in the primary pump suction line. However, the location of the anti-siphon holes is below the maximum water level, thereby allowing at least some amount of water to back flow through the system.

The use of one-way valves and check valves have also been used in attempted prevention of siphoning. For instance, U.S. Pat. No. 3,951,164 (Crist) describes a relatively complex antisiphon and backflow prevention valve. The valve comprises a check valve and an air valve inside a valve body. The use of a complex valve with a large number of parts increases the cost and reduces the reliability of such a system. In a nuclear facility, reliability is of paramount importance. Many systems in a reactor facility are not used until an emergency condition arises. However, they must be in proper working order, even after sitting dormant for relatively long periods of time.

An air gap anti-siphon system for drainage of waste water from a water treatment system to a drain line is shown in U.S. Pat. No. 5,592,964 (Traylor), with an air gap anti-siphon system capable of blocking a sudden sewage backflow. This is accomplished through the use of a disk and tube apparatus fitted into the system. So far as is known, this sewage treatment system with complex and additional apparatus has not been suitable for use in a radioactive material system where a high degree of reliability is necessary.

SUMMARY OF THE INVENTION

The present invention provides a system for transferring a liquid coolant, such as water from a non-contaminated source to a contaminated source while preventing the siphoning of contaminated liquid back into the uncontaminated source. Nuclear contamination is one of the biggest concerns of reactor operators. Great care and expense is taken to minimize the risk of contaminated material being released into an uncontaminated area. With regards to the present invention, the transfer canal is an uncontaminated water source that can be used to provide water for the spent fuel pool, when necessary. The spent fuel pool is a relatively large, sealed compartment that is used to store spent fuel from a nuclear reactor. The pool is filled with water, the level of which must be kept within very specific limits. The water in the pool is in direct contact with the spent fuel and serves to regulate the temperature of thereof. Therefore, the water in the spent fuel pool becomes contaminated with nuclear material over time, due to its exposure to the spent fuel. The water in the spent fuel pool cannot be allowed to enter an uncontaminated source, such as the transfer canal. Likewise, the water in the pool should not be allowed to contaminate the air, equipment or personnel in the vicinity of the spent fuel pool, such as by splashing during a water transfer. When the water level of the spent fuel pool must be raised, water is typically pumped from the transfer canal, through a pipe or hose, and added to the surface of the pool. The difference in height between the canal and the surface of the water in the pool can be substantial, this creates the possibility of a siphon occurring when the pump, which is located near the transfer canal and substantially below the water surface in the pool, stops pumping. Therefore, the anti-siphon system of the present invention is capable of greatly decreasing the risk of contamination associated with maintain the water level in the spent fuel pool.

Preferably, the present invention is an anti-siphon system for transferring uncontaminated water from a transfer canal into the spent fuel pool in a nuclear reactor facility. The system comprises a fluid conduit capable of carrying coolant from the transfer canal to the spent fuel pool. The conduit is typically made from a rigid, non-corrosive material, such as stainless steel, and is substantially L-shaped. A coupling may be attached to the inlet end of the system to facilitate connection of the system with a supply line. At the outlet end of the conduit, a tube is attached. The tube has a larger diameter than the conduit. The tube is attached such that one end is located below the minimum water level of the pool and the opposite end is located above the maximum water level of the pool. The outlet end of the conduit is likewise located above the maximum water level of the pool. The tube may contain a baffle, which is preferably located above the outlet end of the conduit. The baffle serves to prevent splash during a transfer operation, thereby decreasing the likelihood of airborne contamination.

The system may also have a mounting apparatus so that it can be mounted to the seal gates of the spent fuel pool. This allows the system to be properly positioned each time a transfer occurs. It also eliminates the need for personnel to support the system, which can be quite heavy. The mounting apparatus is formed from a bracket which has at least one channel to receive a tab which is attached to a seal gate. Preferably, the apparatus have a plurality of channels for receiving a plurality of tabs. The apparatus also has locking pins to further secure the system when in use.

The system of the present invention does not require any moving parts or other complicated elements. This decreases the maintenance involved in keeping the system operational. In a nuclear reactor facility, reliability is crucial. By decreasing the complexity of the system, there are fewer elements which can fail and produce a detrimental result. Similarly, the costs associated with operation a nuclear facility are tremendous, the present invention is capable of performing a crucial function at a decreased cost.

DETAILED DESCRIPTION OF THE PREFERRED EMBODIMENTS

Figure 1:
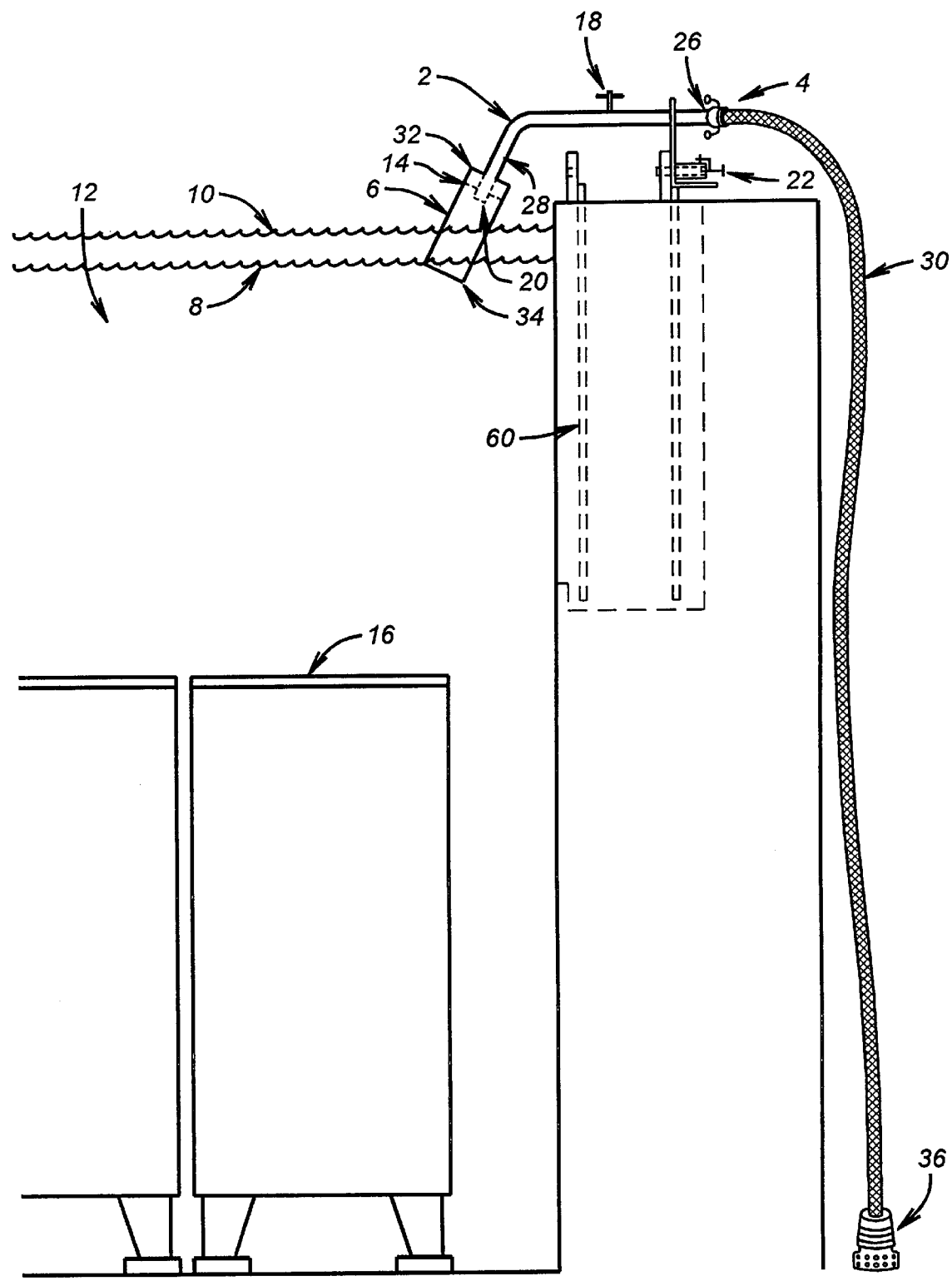
FIG. 1 is an elevation view of the anti-siphon system of the current invention.

The present invention provides an anti-siphon system for transferring water from a transfer canal to a spent fuel pool inside a nuclear reactor facility. As shown in FIG. 1, the system 24 comprises a fluid conduit 2 capable of transporting water therethrough from an inlet end 26 to an outlet end 28. The fluid conduit can be of any suitable material, but is preferably a hardened rigid material. More preferably, the fluid conduit is stainless steel pipe. The conduit is preferably substantially L-shaped.

Attached to the inlet end 26 of the fluid conduit is a coupling 4. The coupling connects the anti-siphon system to the supply conduit 30. Typically, two coupling ends, a male end attached to the supply conduit and a female end attached to the fluid conduit, must be threaded together. While this creates an adequate seal and is useful in the present invention, in a preferred embodiment, the coupling is a "quick-connect" coupling. Quick-connect couplings are joined by fittings that can be snapped together are typically quicker and more convenient to use.

The liquid outlet 20 of the fluid conduit is located inside a tube 6 which is disposed on the outlet end 28 of the fluid conduit. The tube has a larger diameter than the fluid conduit and can be of any suitable material known in the art. Preferably the tube is stainless steel and can be attached to the conduit in any suitable manner, such as by welding. The tube is positioned on the fluid conduit such that the lower end 34 is located below the minimum liquid depth 8 of the spent fuel pool 12. The upper end 34 of the tube is located such that it is above the maximum liquid depth 10 in the pool. Water in the spent fuel pool may contain radioactive contaminants. To prevent contamination of surrounding personnel, air or equipment, it is important to reduce or contain any splash associate with the liquid transfer. This is accomplished in the present invention by surrounding the area between the liquid outlet 20 and the water surface in the pool with the tube.

A baffle 14 is located inside the tube 6 at a height above both the maximum liquid depth 10 of the spent fuel pool and the level of the liquid outlet 20. The baffle allows air to pass between the inside and outside of the tube while preventing splash and is preferably stainless steel having a number of perforations formed therein. It is important that the baffle allow an air space to be maintained between the water surface of the pool and the liquid outlet of the system. The baffle may be secured to the inside of the tube by any method known in the art. For instance, where the tube and/or baffle are a plastic, such as PVC, an adhesive may be useful. Where the baffle and tube are stainless steel or other suitable metal, welding or brazing can be used.

Figure 2:
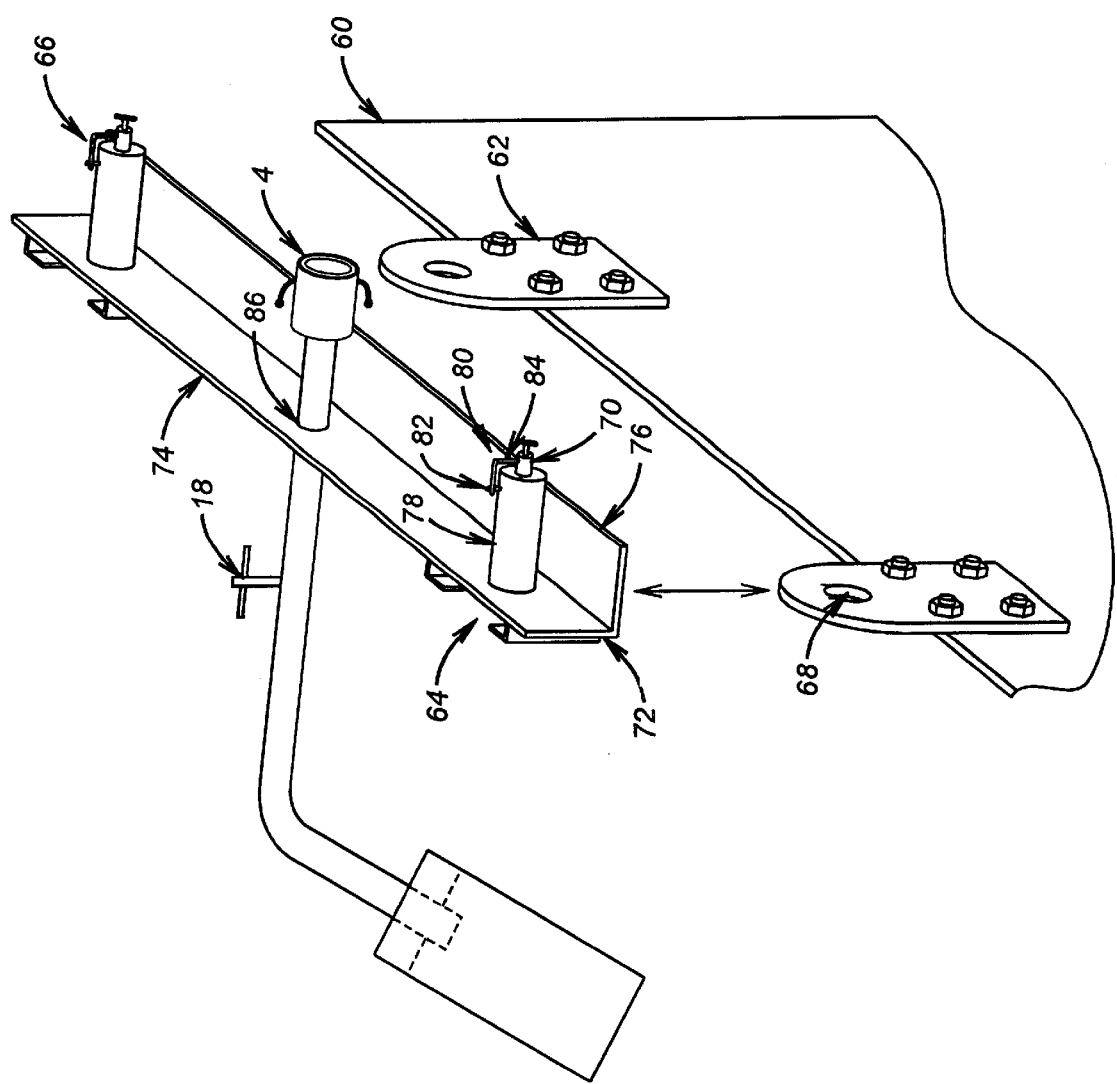
FIG. 2 is a schematic showing the antisiphon system of the current invention.

As shown in FIG. 2, the anti-siphon system of the present invention may provide an mounting apparatus for removably mounting the system to a stationary object. The apparatus may be such that it allows the system to be mounted to a seal gate 60 on the spent fuel pool. The seal gate has a plurality of tabs 62, which are typically bolted or welded to the seal gate. The apparatus is comprised of an angled bracket 72, having an upper end 74 and a lower end 76. The bracket may be made from any suitable material, but is preferably stainless steel. The fluid conduit 2 is attached to the upper end 74 of the angled bracket 72. Preferably, a hole 86 is cut through the upper end 74 and the fluid conduit 2 is passed therethrough and then welded to the bracket. Channels 64 on the apparatus are mounted on the upper end 74 of the bracket 72 and are capable of sliding over the tabs 62 to properly orient the system with regard to the spent fuel pool and to securely mount the system to the seal gate, thereby preventing unwanted movement during fluid transfers. Preferably, the apparatus will include a locking pin mechanism 66 capable of preventing accidental movement of the system. The locking pin mechanism includes a locking pin 70 disposed inside a locking pin cylinder 78. The locking pin cylinder 78 is attached to the angled bracket such that the locking pin will be properly aligned with the seal gate tab hole 68 when the system is in place for a fluid transfer. The locking pin should be capable of being fit through the seal gate tab hole 68, which is disposed in each tab 62. Each locking pin mechanism may also have a locking device 80 comprising a post 82 attached to the external surface of the locking pin cylinder 78 and a latch 84 which is attached to the locking pin 70. The latch is capable of engaging the post such that operator intervention is required to separate the latch from the post. Preferably, each channel will have a locking pin mechanism associated therewith.

A handle 18 may be attached to the system to increase the maneuverability of the system. The handle is attached to the fluid conduit 2 such that is does not protrude through the wall of the conduit, but may be attached at any exterior location that will be useful in aiding operators when moving the system. Preferably the handle is made of stainless steel and is welded to the conduit.

In a preferred embodiment and as shown in FIG. 1, a pump 36 located near the transfer canal draws water from the canal and feeds it through a hose or pipe 30 to the anti-siphon system. The hose is connected to the system via a coupling 4. The pump is typically located at a substantially lower level than the anti-siphon system. This creates the possibility of a siphon forming when the pump is shut off after a transfer operation has been completed. The anti-siphon system prevents such a siphon from forming.

We claim:

1. An anti-siphon system for transferring coolant liquid between a transfer canal and a spent fuel pool having a maximum and minimum established coolant operating level, comprising:

a fluid conduit having an inlet end for insertion in the transfer canal and an outlet end for placement in the spent fuel pool;

a tube mounted on the outlet end of the fluid conduit, the tube having an upper end and a lower end, the lower end being located below minimum liquid depth in the spent fuel pool;

a baffle mounted inside the upper end of the tube, located above maximum liquid depth in the spent fuel pool; and a liquid outlet mounted in the upper end of the tube at a height above maximum liquid depth and below the baffle.

2. The system of claim 1, further including a coupling for removably connecting the anti-siphon system to a coolant supply conduit.

3. The system of claim 2, where the coupling is a quick-connect coupling.

4. The system of claim 1 further comprising a mounting mechanism for removably mounting said system to a wall of the pool.

5. The system of claim 4, wherein the wall of the pool includes at least one seal gate, said system being mounted to the seal gate.

6. The system of claim 4, where the mounting mechanism includes a locking device for preventing accidental movement of the anti-siphon system.

7. The system of claim 6, where the locking device is a spring loaded locking device.

8. The system of claim 1, wherein the baffle is perforated.

9. The system of claim 1, where the fluid conduit extends into the tube and is located below the baffle.

10. The system of claim 1, having a handle disposed on the fluid conduit for moving the anti-siphon system.

11. The system of claim 1, where the tube is stainless steel.

12. An anti-siphon system transferring coolant liquid between a transfer canal and a spent fuel pool having a maximum and minimum established coolant operating level, comprising:

a fluid conduit having an inlet end in the transfer canal and an outlet end in the spent fuel pool;

a tube mounted on the fluid conduit outlet end, the tube having an upper end and a lower end, the lower end being located below minimum liquid depth in the fuel pool;

a baffle mounted inside the upper end of the tube, located above maximum liquid depth in the fuel pool; and a liquid outlet mounted in the upper end of the tube at a height above maximum liquid depth and below the baffle.

13. The system of claim 12, further including a coupling for removably connecting the anti-siphon system to a coolant supply conduit.

14. The system of claim 13, where the coupling is a quick-connect coupling.

15. The system of claim 12, further comprising a mounting mechanism for removably mounting the system to a wall of the pool.

16. The system of claim 15, wherein the wall of said pool includes at least one seal gate, said system being mounted to said seal gate.

17. The system of claim 15, where the mounting mechanism includes a locking device for preventing accidental movement of the anti-siphon system.

18. The system of claim 17, where the locking device is a spring loaded locking device.

19. The system of claim 12, wherein the baffle is perforated.

20. The system of claim 12, where the fluid conduit extends into the tube and is located below the baffle.

21. The system of claim 12, having a handle disposed on the fluid conduit for moving the anti-siphon system.

22. The system of claim 12, where the tube is stainless steel.

* * * * *